United States Patent
Barnes

[11] 3,727,347
[45] Apr. 17, 1973

[54] GROUND COVER
[75] Inventor: Richard D. Barnes, Loves Park, Ill.
[73] Assignee: Southern Imperial, Inc., Tupelo, Miss.
[22] Filed: Sept. 7, 1971
[21] Appl. No.: 178,300

[52] U.S. Cl. ................................47/32
[51] Int. Cl. ..................A01g 9/00, A01g 1/08
[58] Field of Search..................47/9, 25, 32–33

[56] References Cited
UNITED STATES PATENTS

| | | | |
|---|---|---|---|
| 1,453,810 | 5/1923 | Sleen | 47/25 |
| 2,192,939 | 3/1940 | Slayter et al. | 47/9 X |
| 2,748,516 | 6/1956 | McClusky | 47/25 X |
| 2,949,698 | 8/1960 | Downey et al. | 47/9 |
| 3,059,378 | 10/1962 | Noras | 47/25 |

FOREIGN PATENTS OR APPLICATIONS 1,465,465  12/1966  France ........................47/32

OTHER PUBLICATIONS

Washington Post, Jan. 6, 1952, page 13 of Parade Magazine.

*Primary Examiner*—Robert E. Bagwill
*Attorney*—Wolfe, Hubbard, Leydig, Voit & Osann

[57] ABSTRACT

An artificial grass-like covering for the ground around a tree includes a grass-like mat with ends held together in abutting edge-to-edge engagement by a staple which also serves to anchor the mat to the ground thus forming an unbroken ring of artificial grass completely around the base of the tree.

1 Claim, 4 Drawing Figures

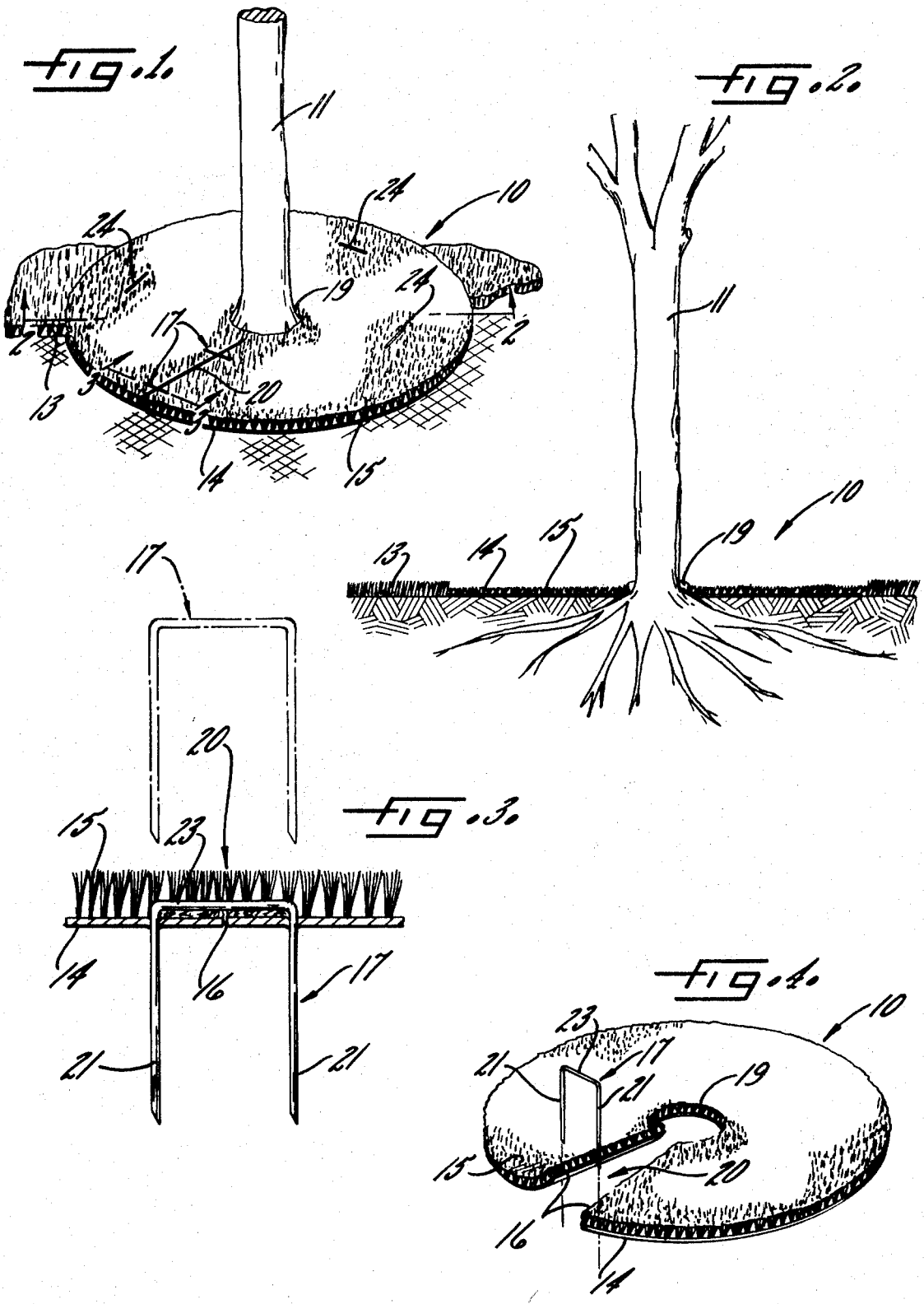

GROUND COVER

BACKGROUND OF THE INVENTION

This invention relates to coverings for the ground around a tree.

SUMMARY OF THE INVENTION

The general object of the present invention is to provide a new and improved artificial ground covering which can be installed around the tree very quickly and easily and, more particularly, to provide a unique ground covering which, when installed, gives the appearance of a well-trimmed unbroken ring of grass completely surrounding the tree.

A more detailed object is to provide a covering formed by a mat of indoor-outdoor carpeting with nap which is of the shape and color of natural grass, the ends of the mat being held together and forming an unbroken ring of artificial grass as an incident to being anchored to the ground.

The invention also resides in the use of a comparatively simple staple not only for anchoring the mat to the ground but also for holding the ends of the mat together.

These and other objects and advantages of the present invention will become more apparent from the following detailed description when taken in conjunction with the accompanying drawings.

BRIEF DESCRIPTION OF THE DRAWINGS

FIG. 1 is a perspective view of a covering embodying the novel features of the present invention.

FIG. 2 is a cross-sectional view taken substantially along line 2—2 of FIG. 1.

FIG. 3 is an enlarged cross-sectional view taken substantially along line 3—3 of FIG. 1.

FIG. 4 is an enlarged exploded perspective view of parts of the covering.

DETAILED DESCRIPTION OF THE PREFERRED EMBODIMENT

The present invention contemplates an artificial ground covering 10 suitable for use as a substitute for natural coverings in areas where it is desirable to have the area appear natural without the attendant responsibility of taking care of the area so that it always appears well kept and maintained. One such area is illustrated in FIG. 1 where an artificial grass-like covering 10 is laid end-to-end around the base of a tree 11 to form an aesthetically pleasing ring of artificial grass between a lawn 13 of natural grass and the tree. Herein, the covering is of conventional indoor-outdoor carpeting and preferably includes a flexible mat 14 (see FIG. 4) with a grass-like nap 15 attached to one side thereof. The nap is made of grass-colored plastic formed in individual strands which are the size and shape of a blade of grass. Thus, when laid around the tree, covering 10 follows the contours of the ground, blends in with the natural grass along the adjacent edges of the covering and the grass, and forms what appears to be a natural grass covering of the ground all the way to the base of the tree.

In carrying out the invention, provision is made of a new and improved artificial ground covering 10 in which a staple 17 inserted through the mat 14 serves both to anchor the mat to the ground around the tree 11 and to hold the ends 16 of the mat together in abutting edge-to-edge engagement. Thus, the covering is held securely in place around the base of the tree to completely cover the ground and provide an area of pleasing appearance which requires very little maintenance. This is true particularly of the artificial grass covering which gives the appearance of well-trimmed grass and which does not require the attention necessary to maintain a similar covering of natural grass.

It will be appreciated that any desirable shape of mat 14 may be used without departing from the intended scope of the present invention but, in the present instance, the mat is shown as being generally circular in shape and centered around the tree 11. An opening 19 in the central area of the mat fits close around the tree and a slit 20 extends from the periphery of the mat into the opening. When manufactured, the opening is of a relatively small diameter so that it can be cut out as desired to fit around a particularly sized tree. As shown in FIG. 4, the slit 20 extends in generally a radial direction from the center of the mat so that the mat is formed as a broken ring with the opposite ends 16 of the mat located adjacent and facing each other. Since the mat is flexible, the ends can be pulled away from each other as shown in FIG. 4 to widely open the slit for sliding the mat in around the base of the tree.

Once the mat 14 has been laid on the ground around the base of the tree 11, the staple 17 is inserted through the mat and into the ground and serves both to fasten the mat securely on the ground and to hold the slit 20 closed. Herein, the staple (see FIG. 3) is generally U-shaped, preferably being formed of a single piece of relatively stiff wire with legs 21 bent at right angles with respect to a central cross member 23. The tips of the legs preferably are pointed to facilitate insertion of the staple through the mat and into the ground. When inserting the staple through the mat, the free end of each leg is positioned adjacent the slit 20, one leg being located on each side of the slit and the cross member bridging the slit as shown in FIG. 3. Once inserted through the mat and into the ground, the legs hold the ends 16 of the mat in abutting edge-to-edge engagement to close the slit. In this position, the cross member 23 is concealed partially by the nap 15 and rests against the mat 14 to anchor the latter to the ground. Preferably, the nap is shorter than the normal fresh-cut height of the surrounding natural grass to the nap from being cut by a lawn mower.

As shown in FIG. 1, additional similar staples 24 may be inserted through the mat at positions spaced angularly from the staple 17 to assist the latter staple in fastening the mat to the ground. Also, more than one staple may be used across the slit 20 if desired.

From the foregoing, it will be apparent that the present invention provides a unique grass-like covering 10 which can be installed very quickly and easily on the ground surrounding a tree, the staple 17 advantageously serving to anchor the mat 14 securely in place and, at the same time to hold the slit 20 closed. Thus, the covering eliminates the need for trimming and other maintenance normally required for a similar covering of actual grass.

I claim as my invention:

1. An artificial grass-like covering for the earth surrounding the base of a living tree and comprising a mat having a flexible backing with a plurality of grass-like plastic strands attached thereto and extending vertically therefrom, said mat having a central opening receiving the tree, a single slit leading from the periphery of the mat and into the opening and having edges defining the ends of the mat, the ends of the mat being separable to permit the mat to be placed around or removed from the tree, a plurality of U-shaped staples spaced circumferentially around the tree, inserted through said mat and embedded in the earth to anchor the mat to the earth, one of said staples being inserted through said mat in bridging relation with said slit and holding the ends of the mat together in abutting edge-to-edge engagement to conceal the slit and thereby form an unbroken ring appearing as well-trimmed grass completely surrounding the base of the tree, and the height of said strands at all times being lower than the cutting height of the natural grass surrounding the tree to avoid cutting of the strands by a lawn mower.

* * * * *